(12) United States Patent
Shi et al.

(10) Patent No.: US 12,332,484 B2
(45) Date of Patent: Jun. 17, 2025

(54) FIBERMOUNT

(71) Applicant: LUMENTUM TECHNOLOGY UK LIMITED, Northamptonshire (GB)

(72) Inventors: Zhengwei Shi, Houston, TX (US); Jihua Du, San Jose, CA (US); Prasad Yalamanchili, San Jose, CA (US)

(73) Assignee: Lumentum Technology UK Limited, Northamptonshire (GB)

( * ) Notice: Subject to any disclaimer, the term of this patent is extended or adjusted under 35 U.S.C. 154(b) by 351 days.

(21) Appl. No.: 18/154,472

(22) Filed: Jan. 13, 2023

(65) Prior Publication Data

US 2024/0134128 A1 Apr. 25, 2024

Related U.S. Application Data

(60) Provisional application No. 63/380,492, filed on Oct. 21, 2022.

(51) Int. Cl.
*G02B 6/36* (2006.01)

(52) U.S. Cl.
CPC .................. *G02B 6/3616* (2013.01)

(58) Field of Classification Search
CPC .................................... G02B 6/3616
See application file for complete search history.

(56) References Cited

U.S. PATENT DOCUMENTS

RE41,840 E * 10/2010 Gilman ............... G02B 6/4202
385/94

* cited by examiner

*Primary Examiner* — Sung H Pak
*Assistant Examiner* — Hoang Q Tran
(74) *Attorney, Agent, or Firm* — Harrity & Harrity, LLP

(57) ABSTRACT

An optical device may include an optical fiber, a solder material, and a fibermount comprising a non-porous material. The optical fiber may be affixed to the fibermount by the solder material. The non-porous material of the fibermount may have a thermal conductivity of less than 20 Watts per meter-Kelvin (W/m-K). A coefficient of thermal expansion (CTE) of the non-porous material of the fibermount may match a CTE of the solder material. The CTE of the non-porous material of the fibermount may match a CTE of a material of the optical fiber.

20 Claims, 4 Drawing Sheets

|  | BF33 | ZrO$_2$ | Al$_2$O$_3$ | SiO$_2$ | BK7 |
|---|---|---|---|---|---|
| CTE (ppm/K) | 3.25 | 10.00 | 7.00 | 0.54 | 7.00 |
| Therm. cond. (W/m-k) | 1.20 | 2.20 | 12.00 | 1.46 | 1.21 |
| Young's mod. (GPa) | 64.0 | 210.0 | 470.0 | 73.1 | 82.0 |
| Porosity (%) | 0 | 0 | 0 | 0 | 0 |

FIG. 2

FIBERMOUNT

CROSS-REFERENCE TO RELATED APPLICATION

This patent Application claims priority to U.S. Provisional Patent Application No. 63/380,492, filed on Oct. 21, 2022, and entitled "FIBER MOUNT DESIGN." The disclosure of the prior Application is considered part of and is incorporated by reference into this patent Application.

TECHNICAL FIELD

The present disclosure relates generally to a fibermount and, more particularly, to a fibermount that improves stability of coupling of an optical fiber to a laser diode by having a low thermal conductivity and coefficient of thermal expansion (CTE) that is matched to a solder material and to the optical fiber.

BACKGROUND

An optical package such as a fiber-coupled pump module package may include a fibermount that attaches an optical fiber at a desired power position relative to a light source (e.g., a laser diode) to achieve a desired coupling during the alignment process. The fibermount may be designed to hold the optical fiber at the desired position to ensure that the optical package delivers high performance over a lifetime of the optical package.

SUMMARY

In some implementations, an optical device includes an optical fiber; a solder material; and a fibermount comprising a non-porous material, the optical fiber being affixed to the fibermount by the solder material, wherein the non-porous material of the fibermount has a thermal conductivity of less than 20 Watts per meter-Kelvin (W/m–K), wherein a coefficient of thermal expansion (CTE) of the non-porous material of the fibermount matches a CTE of the solder material, and wherein the CTE of the non-porous material of the fibermount matches a CTE of a material of the optical fiber.

In some implementations, an optical device includes a fibermount, wherein a material of the fibermount comprises a ceramic material or a glass material, wherein the material of the fibermount is CTE-matched to respective materials of each of one or more other components of the optical device, and wherein the material of the fibermount is a non-porous material.

In some implementations, a device includes a fibermount including a body portion formed from a non-porous material, the non-porous material being a ceramic material or a glass material; and an optical fiber affixed to the fibermount by a solder material, wherein a CTE of the non-porous material is within approximately 16 parts per million per degree Kelvin (ppm/K) of a CTE of a material of the optical fiber and a CTE of the solder material.

BRIEF DESCRIPTION OF THE DRAWINGS

FIG. 2 is a table illustrating various characteristics of the example materials of the improved fibermount described herein.

DETAILED DESCRIPTION

Figure 1:
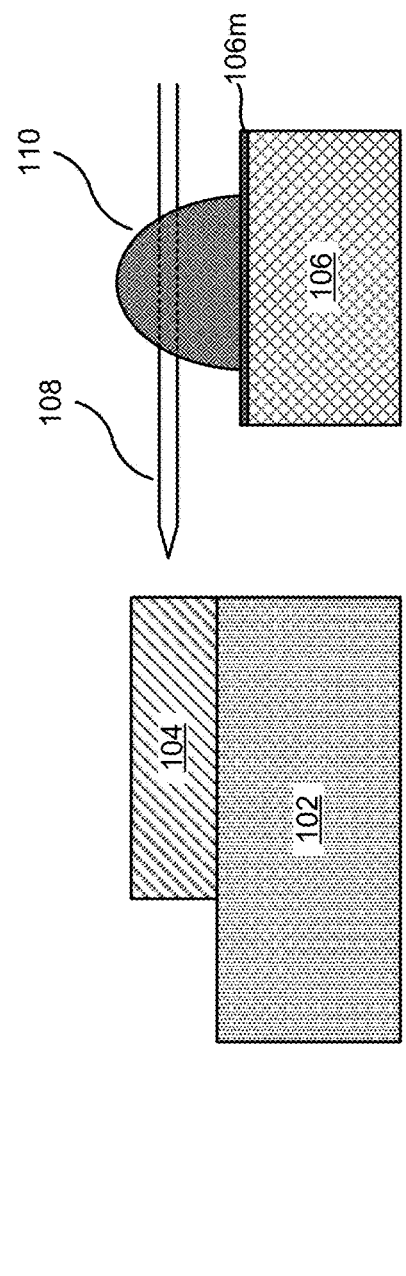
FIG. 1 is a diagram of an example optical package including an improved fibermount as described herein.

The following detailed description of example implementations refers to the accompanying drawings. The same reference numbers in different drawings may identify the same or similar elements.

As noted above, an optical package may use a fibermount in association with mounting an optical fiber at a desired (e.g., optimal) power position relative to a light source (e.g., a laser diode) to achieve a desired (e.g., highest possible) coupling of the light source and the optical fiber. One example of such an optical package is a fiber-coupled pump module package (also referred to as a pump laser). Such an optical package may be used in an application that poses high requirements with respect to performance reliability, such as a submarine application or an aerospace application. These high requirements with respect to performance reliability necessitate stringent component and process design and development for the optical package.

In some optical packages, an optical fiber may be affixed to (i.e., attached to) a fibermount with a creep-resistant solder material under a stringent process condition, such as a high temperature condition (e.g., greater than 350 degrees Celsius (° C.)), using laser irradiation or another solder heating technique. Such a process may necessitate special requirements with respect to design of the fibermount. For example, the fibermount may need to be formed from a material with a low thermal conductivity to preserve heat locally and provide efficient reflow of solder. The low thermal conductivity can bring other benefits, such as improved energy efficiency in the process (e.g., less energy required to reflow solder), simplified design for providing heat dissipation, and simplified processing condition/environment control. Additionally, a high material integrity may be required to ensure sustainability of the fibermount under the high temperature exposure. Further, after the reflow process, a match between a coefficient of thermal expansion (CTE) of a material of the fibermount to CTEs of materials of other components is desirable so as to synchronize potential deformation and to maintain performance reliability during temperature fluctuations.

Design and development of a material for a fibermount is challenging when taking the above-noted application-related parameters into consideration. Conventionally, an aluminum silicate ceramic material based on natural lava—referred to as M120—has been used as a fibermount material in such applications. However, when used as a fibermount material, M120 requires a nickel-oxide thick film metallization layer in order to improve CTE matching with a solder material used for attachment of an optical fiber on the fibermount. However, a significant CTE mismatch remains even with the nickel-oxide thick film metallization, and a higher soldering temperature used for attachment of the optical fiber can result in cracks in the fibermount that cannot be prevented.

Implementations described herein provide a fibermount comprising a non-porous material with low thermal conductivity and a CTE that is matched to that of a solder material (e.g., a glass solder) and a material of an optical fiber. In some implementations, the fibermount described herein improves stability of coupling of the optical fiber to a light source. In some implementations, the fibermount may include a thin metallization layer that facilitates glass solder wetting and/or adhesion during a laser soldering process associated with attaching the fiber to the fibermount. Additional details are provided below.

FIG. 1 is a diagram of an example optical package 100 including an improved fibermount as described herein. As shown in FIG. 1, the optical package 100 includes a substrate 102, a light source 104, a fibermount 106, an optical fiber 108, and a solder material 110. In some implementations, the optical package 100 may be, for example, a fiber-coupled pump module package. That is, in some implementations, the optical package 100 may be included in a fiber pump.

The substrate 102 is a substrate that provides structural support for one or more components of the optical package 100 and/or that provides a surface on which one or more components of the optical package 100 are formed or mounted. For example, as shown in FIG. 1, the substrate 102 may provide a surface on which the light source 104 is formed or mounted.

The light source 104 is a component that emits light that is to be coupled to the optical fiber 108. For example, the light source 104 may include a laser diode. The light source may be, for example, edge emitting (e.g., an edge emitting laser (EEL)), vertically emitting (e.g., a vertical-cavity surface-emitting laser (VCSEL)), or the like. The light emitted by the light source 104 may have a wavelength of, for example, 980 nanometers (nm) or 1480 nm, or another wavelength. As shown in FIG. 1, the light source 104 may be mounted on, formed on, or affixed to the substrate 102 to enable the light source 104 to be optically coupled to the optical fiber 108.

The fibermount 106 is a component used to mount the optical fiber 108 for optical coupling to the light source 104. In some implementations, the fibermount 106 may be structured so as to hold the optical fiber 108 at a desired (e.g., optimal) power position relative to the light source 104 in order to achieve a desired (e.g., highest possible) coupling of the light source 104 and the optical fiber 108. As shown in FIG. 1, the optical fiber 108 may be affixed to the fibermount 106 by the solder material 110, with the solder material 110 being a material for attachment of the optical fiber 108 to the fibermount 106. In some implementations, the solder material 110 may be a glass solder material or another type of solder, such as a gold-tin (AuSn) solder.

As described in further detail below, the fibermount 106 improves stability of coupling of the optical fiber 108 and the light source 104 (e.g., as compared to a fibermount formed from M120 or a fibermount formed from aluminum nitride). In some implementations, the fibermount 106 has one or more characteristics (e.g., a thermal conductivity, a CTE, a mechanical property, manufacturability, or the like) that enable the fibermount 106 to be used in a variety of applications, even a high-requirement application such as a submarine application or an aerospace application, among other examples. In some implementations, the fibermount 106 provides improved performance in terms of a large process window, performance, and reliability (e.g., temperature cycling (TC), high temperature storage (HTS), or the like). Further, the fibermount 106 may comprise a ceramic material or a glass material. Thus, the fibermount 106 provides a number of advantages, such as a reduced cost, improved flexibility of component quality control, and improved supply chain security (e.g., as compared to using M120). Further, as described above, the fibermount 106 comprises a material with a CTE that matches that of the solder material 110 used for attachment of the optical fiber 108, meaning that no additional (and possibly complex) metallization is required, while also reducing a likelihood of cracking of the fibermount 106. Additional details regarding the fibermount 106 are described below.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

In some implementations, the fibermount 106 comprises a non-porous material (e.g., a material with a porosity in a range from 0% to 0.5%). In some implementations, the use of the non-porous material for the fibermount 106 reduces stress in the fibermount 106 that could result from temperature fluctuations in an environment of the fibermount 106. The reduction in stress reduces a likelihood of cracking of the fibermount 106, thereby improving performance and reliability of the fibermount 106 (e.g., as compared to a material with a non-zero porosity, such as M120, which has a porosity of approximately 2-3%).

In some implementations, the non-porous material of the fibermount 106 has a thermal conductivity of less than 20 Watts per meter-Kelvin (W/m–K). In some implementations, the use of a low thermal conductivity material (i.e., a material having a thermal conductivity of less than 20 W/m–K) enables preservation of heat locally at the fibermount 106 (e.g., the low thermal conductivity reduces an amount of heat that dissipates to other components of the optical package 100) and enables efficient reflow of the solder material 110 during attachment of the optical fiber 108 as part of a solder process (e.g., a solder reflow process that requires a high processing temperature, such as a temperature greater than approximately 350° C.). Thus, the low thermal conductivity of the fibermount 106 reduces or eliminates an impact on one or more other components of the optical package 100 (i.e., one or more other components in the optical package 100 are not heated to the high temperature). In some implementations, the low thermal conductivity also improves energy efficiency in the solder process (e.g., less energy is required to reflow the solder material 110). Further, the low thermal conductivity of the fibermount 106 enables a relatively simple component and system design to dissipate extra heat in the optical package 100, and/or simplifies processing condition or environment control. Notably, the low thermal conductivity of the material of the fibermount 106 enables improved performance and reliability and simplified design as compared to a fibermount that includes material with a high thermal conductivity, such as an aluminum nitride material with a thermal conductivity of approximately 170 W/(m·K).

In some implementations, the non-porous material of the fibermount 106 has a CTE that matches a CTE of the solder material 110. For example, the non-porous material of the fibermount 106 may have a CTE that is within 16 parts per million per degree Kelvin (ppm/K) of the CTE of the solder material 110 (e.g., within 7 ppm/K of the CTE of the solder material 110, which may have a CTE of approximately 7.5 ppm/K). In some implementations, the non-porous material of the fibermount 106 has a CTE that matches a CTE of the material of the optical fiber 108. For example, the non-porous material of the fibermount 106 may have a CTE that is within 16 ppm/K of the CTE of the material of the optical fiber 108 (e.g., within 7 ppm/K of the CTE of the optical fiber 108, which may have a CTE of approximately 0.6 ppm/K). In some implementations, the CTE matching of the fibermount 106 with one or more other components (e.g., the optical fiber 108, the solder material 110, or the like) reduces or minimizes deformation among components of the optical package 100 and/or enables performance and reliability to be maintained during temperature fluctuations. Further, the CTE matching of the fibermount 106 with one or more other components means that a thick (complex) metallization layer is not needed in order to relieve accumulated stress from adjacent components due to a CTE mismatch.

In some implementations, the non-porous material of the fibermount 106 may include a material with a low thermal conductivity that is CTE-matched to the solder material 110 and the material of the optical fiber 108. Examples of such materials include borosilicate glass (BF33), zirconium dioxide ($ZrO_2$), aluminum oxide ($Al_2O_3$), silicon dioxide ($SiO_2$), or borosilicate crown glass (BK7). FIG. 2 is a table illustrating various characteristics of these example materials. The examples shown in FIG. 2 are provided for illustrative purposes, and other examples may differ from what is described with regard to FIG. 2.

In some implementations, the fibermount 106 may include a surface metallization layer 106m (e.g., one or more metal layers on a top surface of the fibermount 106). In some implementations, the surface metallization layer 106m provides effective heat conduction, promotes wetting, and enhances bonding strength. In some implementations, the surface metallization layer 106m may include a thin metallization layer (e.g., the surface metallization layer 106m may comprise a metallization layer with five or fewer metal layers). In some implementations, the surface metallization layer 106m comprise, for example, one or more titanium (Ti) layers or one or more nickel (Ni) layers. Notably, the surface metallization layer 106m used for the fibermount 106 may in some implementations not include any precious metals, such as gold (Au), platinum (Pt), or palladium (Pd). In some implementations, the surface metallization layer 106m may include a thick metallization layer (e.g., the surface metallization layer 106m may comprise a metallization layer with more than five metal layers). In some such implementations, the surface metallization layer 106m comprise, for example, one or more precious metals.

Figure 3:
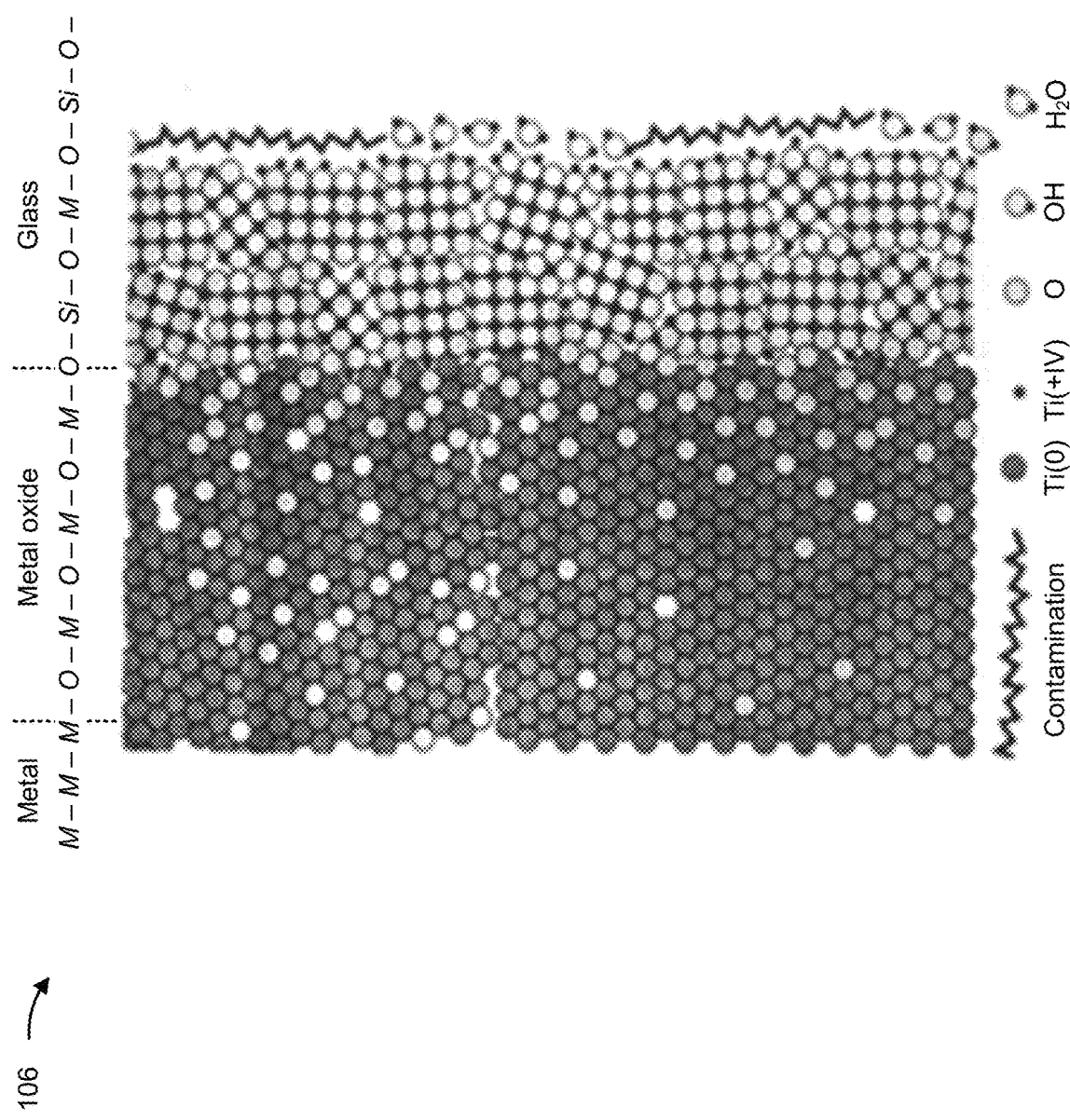
FIG. 3 illustrates a surface metallization layer design principle for a surface metallization layer of the improved fibermount described herein.

A conventionally used metallization layer (e.g., a metallization layer used for a fibermount comprising M120) is comparatively more complex than the surface metallization layer 106m of the fibermount 106. For example, the conventional metallization layer includes more than five layers and includes one or more precious metals. Conversely, the surface metallization layer 106m of the fibermount 106 uses a relatively simple and lower-cost metal combination that does not require any precious metals. Under ambient atmosphere, materials of the surface metallization layer 106m of the fibermount 106 (e.g., Ti or Ni) may be prone to forming a thin layer of metal oxide at the surface. This thin oxide layer can improve wetting and adhesion performance with the solder material 110 (e.g., glass solder) by an interfacial chemical bonding. Thus, the surface metallization layer 106m may in some implementations facilitate glass solder wetting/adhesion during a laser soldering process associated with affixing the optical fiber 108 to the fibermount 106. FIG. 3 illustrates the surface metallization layer design principle for the surface metallization layer 106m of the fibermount 106. The example shown in FIG. 3 is provided for illustrative purposes, and other examples may differ from what is described with regard to FIG. 3.

In some implementations, an infrared (IR) laser (e.g., a laser with a wavelength of approximately 940 nm) may be used to reflow the solder material 110 for attachment of the optical fiber 108 to the fibermount 106. That is, an IR laser triggered solder reflow process may in some implementations be utilized for attaching the optical fiber 108 to the fibermount 106 using the solder material 110. During the solder reflow process, heat from the IR laser can be localized in an area of the solder material 110 to ensure high energy efficiency in the process, as well as to reduce extremely high temperature exposure on the fibermount 106. Such a processing method enables increased compact module design and development. In some implementations, the use of the IR laser simplifies the solder reflow process, as the solder material 110 (e.g., a glass solder material) may absorb comparatively more IR light as compared to other solders, such as a gold-tin solder.

In general, the fibermount 106 can provide the following advantages: (1) the use of widely available materials, (2) no additional complicated metallization is needed for CTE matching, (3) a low cost, simple, thin surface metallization layer, (4) supply chain security, (5) improved component quality control, (6) reduced cost, (7) a large process window for alignment of the optical fiber 108 with a creep resistant solder material 110, (8) reduction of built-in stress in a fiber adjoint (e.g., due to differences in temperature and CTE mismatch of components), and/or (9) the use of an IR laser triggered reflow process that enables compact module design.

In some implementations, a layout or a geometry of the fibermount 106 can take a variety of forms, shapes, or dimensions. Similarly, a structure of the fibermount 106 can have a variety of shapes or sizes (e.g., as dictated by a module package design). Further, a pattern or structure of the surface metallization layer 106m of the fibermount 106 may vary across the surface of the fibermount 106.

FIGS. 4A-4D are diagrams illustrating example implementations of the fibermount 106. In the examples shown in FIGS. 4A-4D, the fibermount 106 comprises a fibermount body 106b and a surface metallization layer 106m. The fibermount body 106b may comprise, for example, BF33, $ZrO_2$, $Al_2O_3$, $SiO_2$, or BK7. The surface metallization layer 106m may comprise a thin metallization layer (e.g., a stack of five or fewer metal layers) comprising Ti or Ni.

Figure 4B:
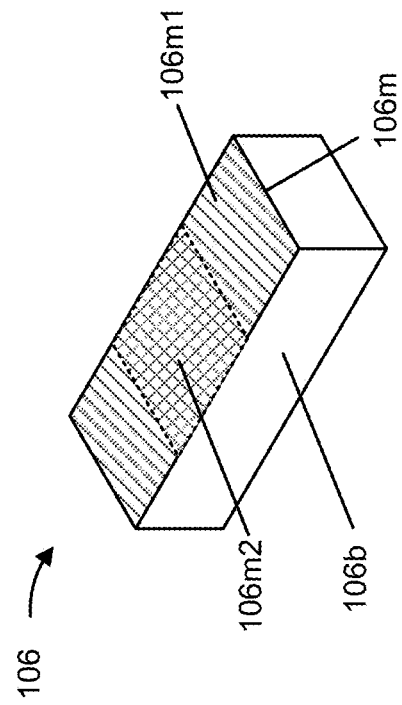
FIGS. 4A-4D are diagrams illustrating example implementations of the improved fibermount described herein.
Figure 4D:
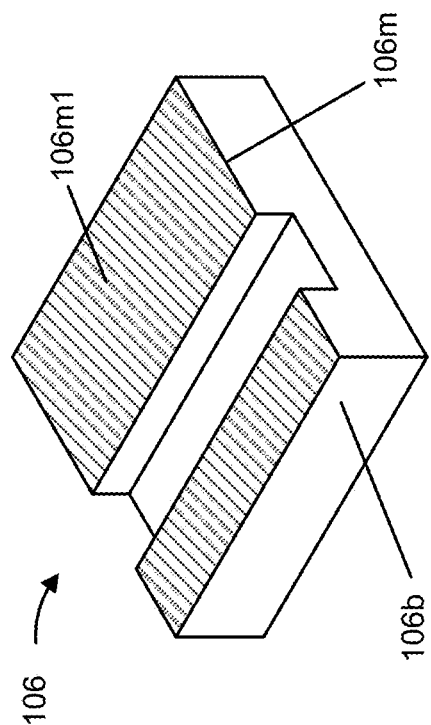
Figure 4A:
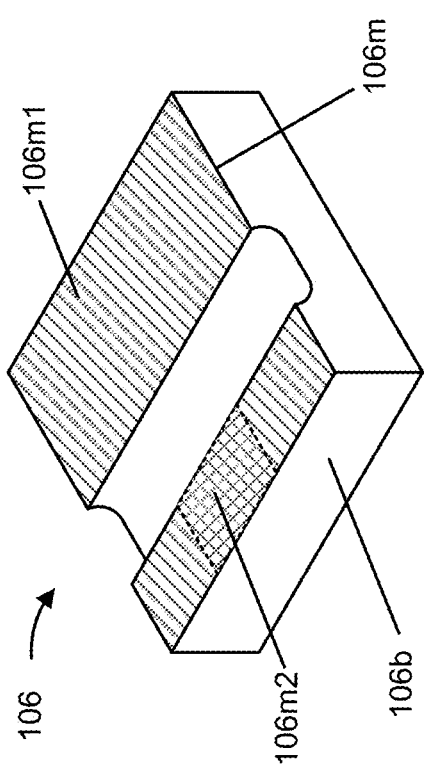

In the example shown in FIG. 4A, the fibermount 106 has a trench design and comprises a surface metallization layer 106m including a first metallization pattern 106m1 and a second metallization pattern 106m2 in one area on the surface of the fibermount 106. In some implementations, a metallization pattern may be used within a given area on the surface of the fibermount 106 based on, for example, a characteristic of the solder material 110 (e.g., a particular metallization pattern can be selected so as to improve adhesion with a particular type of solder material 110), a characteristic of the optical fiber 108, or some other characteristic associated with the optical package 100.

In the example shown in FIG. 4B, the fibermount 106 has a brick design and comprises a surface metallization layer 106m including a first metallization pattern 106m1 and a second metallization pattern 106m2 in one area on the surface of the fibermount 106.

Figure 4C:
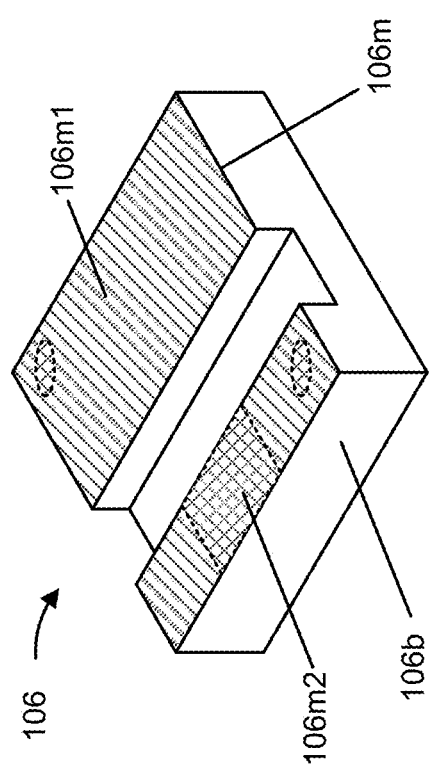

In the example shown in FIG. 4C, the fibermount 106 has a trench design and comprises a surface metallization layer 106m including a first metallization pattern 106m1 and a second metallization pattern 106m2 in multiple (separate) areas on the surface of the fibermount 106.

In the example shown in FIG. 4D, the fibermount 106 has a trench design and comprises a surface metallization layer 106m including a first metallization pattern 106m1 only.

As indicated above, FIGS. 4A-4D are provided as examples. Other examples may differ from what is described with regard to FIGS. 4A-4D. The structure, form, pattern, and layers of the fibermounts 106 and surface metallization layers 106m shown in FIGS. 4A-4D are provided as examples.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An optical device, comprising:
   an optical fiber;
   a solder material; and
   a fibermount comprising a non-porous material, the optical fiber being affixed to the fibermount by the solder material,
   wherein the non-porous material of the fibermount has a thermal conductivity of less than 20 Watts per meter-Kelvin (W/m–K),
   wherein a coefficient of thermal expansion (CTE) of the non-porous material of the fibermount matches a CTE of the solder material, and
   wherein the CTE of the non-porous material of the fibermount matches a CTE of a material of the optical fiber.

2. The optical device of claim 1, wherein the non-porous material comprises at least one of borosilicate glass (BF33), zirconium dioxide ($ZrO_2$), aluminum oxide ($Al_2O_3$), silicon dioxide ($SiO_2$), or borosilicate crown glass (BK7).

3. The optical device of claim 1, wherein the solder material comprises a glass solder material.

4. The optical device of claim 1, wherein the CTE of the non-porous material of the fibermount is within 16 parts per million per degree Kelvin (ppm/K) of the CTE of the solder material.

5. The optical device of claim 1, wherein the CTE of the non-porous material of the fibermount is within approximately 16 parts per million per degree Kelvin (ppm/K) of the CTE of the material of the optical fiber.

6. The optical device of claim 1, wherein the fibermount comprises a surface metallization layer.

7. The optical device of claim 6, wherein the surface metallization layer comprises at least one of titanium (Ti) or nickel (Ni).

8. The optical device of claim 6, wherein the surface metallization layer does not include gold (Au), platinum (Pt), or palladium (Pd).

9. The optical device of claim 6, wherein the surface metallization layer comprises no more than five layers.

10. An optical device, comprising:
    a fibermount, wherein a material of the fibermount comprises a ceramic material or a glass material,
    wherein the material of the fibermount is coefficient of thermal expansion (CTE)-matched to respective materials of each of one or more other components of the optical device,
    wherein the material of the fibermount has a thermal conductivity of less than approximately 20 Watts per meter-Kelvin (W/m–K), and
    wherein the material of the fibermount is a non-porous material.

11. The optical device of claim 10, wherein the material of the fibermount comprises at least one of borosilicate glass (BF33), zirconium dioxide ($ZrO_2$), aluminum oxide ($Al_2O_3$), silicon dioxide ($SiO_2$), or borosilicate crown glass (BK7).

12. The optical device of claim 10, wherein the one or more other components include a glass solder material and an optical fiber, wherein the optical fiber is affixed to the fibermount by the glass solder material.

13. The optical device of claim 10, wherein a CTE of the material of the fibermount is within approximately 16 parts per million per degree Kelvin (ppm/K) of respective CTEs of each of the one or more other components of the optical device.

14. The optical device of claim 10, wherein the fibermount comprises a surface metallization layer comprising at least one of titanium (Ti) or nickel (Ni).

15. The optical device of claim 14, wherein the surface metallization layer comprises no more than five layers.

16. A device, comprising:
   a fibermount including a body portion formed from a non-porous material, the non-porous material being a ceramic material or a glass material; and
   an optical fiber affixed to the fibermount by a solder material,
      wherein a coefficient of thermal expansion (CTE) of the non-porous material is within approximately 16 parts per million per degree Kelvin (ppm/K) of a CTE of a material of the optical fiber and a CTE of the solder material.

17. The device of claim 16, wherein the non-porous material comprises at least one of borosilicate glass (BF33), zirconium dioxide ($ZrO_2$), aluminum oxide ($Al_2O_3$), silicon dioxide ($SiO_2$), or borosilicate crown glass (BK7).

18. The device of claim 16, wherein the fibermount comprises a surface metallization layer comprising one or more layers formed from non-precious metals.

19. The device of claim 18, wherein the surface metallization layer comprises no more than five layers.

20. The optical device of claim 10, wherein the fibermount comprises a surface metallization layer comprising one or more layers formed from non-precious metals.

* * * * *